United States Patent [19]

Klebe et al.

[11] 4,135,010
[45] Jan. 16, 1979

[54] SODIUM PERCARBONATE PARTICLES (B)

[75] Inventors: Hans Klebe, Rheinfelden; Gerd Knippschild, Wehr; Hubert Schuster, Karsau-Beuggen, all of Germany

[73] Assignee: Deutsche Gold- und Silber-Scheideanstalt vormals Roessler, Frankfurt, Germany

[21] Appl. No.: 837,261

[22] Filed: Sep. 27, 1977

[30] Foreign Application Priority Data

Mar. 19, 1977 [DE] Fed. Rep. of Germany ....... 2712138

[51] Int. Cl.$^2$ ............................................. B05D 7/24
[52] U.S. Cl. ...................................... 427/215; 252/99;
252/186; 427/214; 428/402
[58] Field of Search .................. 252/99, 186; 427/214, 427/215; 428/402, 403

[56] References Cited

U.S. PATENT DOCUMENTS

| 3,932,295 | 1/1976 | Fujino et al. ..................... 252/99 X |
| 3,977,988 | 8/1976 | Tokiwa et al. ........................ 252/99 |

Primary Examiner—Mayer Weinblatt
Attorney, Agent, or Firm—Cushman, Darby & Cushman

[57] ABSTRACT

There are prepared sodium percarbonate particles consisting essentially of a sodium percarbonate nucleus encased in a layer of sodium silicate and sodium percarbonate and/or sodium tripolyphosphate.

17 Claims, No Drawings

SODIUM PERCARBONATE PARTICLES (B)

BACKGROUND OF THE INVENTION

The invention concerns a new type of sodium percarbonate particle.

The use of sodium percarbonate as a bleaching agent alone or in washing agents is of increasing interest since the washing process is increasingly carried out at low temperatures down to as low as room temperature.

In contrast to sodium perborate tetrahydrate ($NaBO_2 \cdot H_2O_2 \cdot 3H_2O$) (theoretical active oxygen = 10.4%) it has the advantage of greater solubility at 20° C and a greater active oxygen content (theoretical active oxygen = 15.3%). However, it has the severe disadvantage that it has very little storage stability in a non-dry atmosphere. Thus, the slight amounts of moisture which are present already in the atmosphere and/or in the washing agent are sufficient to bring about the decomposition of the percarbonate.

Especially in warmer zones, where a higher temperature prevails, the decomposition once initiated progresses rapidly.

This problem was known early and therefore for a long time there have been efforts to increase the storage stability of sodium percarbonate in various ways.

Thus, there has been attempted the obtaining of increased stability with the help of aerosols such as silica aerosols (German Pat. No. 870,092).

Also by the addition of benzoic acid the stability should be increased (German OS 1 767 796).

The additives were added either during the production of the percarbonate or in connection with the production of the finished product.

It has already been tried to obtain a stable product by using stabilizers and complex formers which eliminates the impurities of the added soda or the impurities which appear during the process. (German OS 2 234 135)

Another idea which has been tried repeatedly is to protect the percarbonate particles by encasing with a protective layer before the decomposition influences take effect. Thus, according to French Pat. No. 893,115 there have been used natural or synthetic resins, or according to German OS 2 511 143 polyethylene glycol, or there have been used copolymers in which one of the monomers was vinyl chloride or vinylidene chloride (German OS 2 402 392 and 2 402 393).

There has also been proposed encasing with a sodium silicate solution (British Pat. No. 174,891) or a mixture of alkali or alkaline earth silicate and silicofluoride (German OS 2 511 143) or an aqueous sol of silicates (Belgium Pat. No. 820,741).

However, it is indicated that the stability is only retained if the storage is in dry air at 20° C. In any case, however, whatever the reason there was always present so much moisture that the decomposition of the percarbonate began, the storage temperature increased due to the heat of decomposition which accelerated the further decomposition of the percarbonate as did the water obtained from the hydrogen peroxide decomposition.

Thus, there occur active oxygen losses of 40% and more within 15 days if the stability test is carried out at 40° C and 80% relative air humidity (German OS 2 511 143).

The object of the invention therefore is the production of a percarbonate relatively stable in a moist and warm environment, whose loss of activity in the same type of environment is still comparatively small and which retains its good speed of solubility after the stabilization.

SUMMARY OF THE INVENTION

It has now been found that this object can be attained by a sodium percarbonate particle which consists of a sodium percarbonate nucleus and a jacket or encasing layer of a sodium silicate and sodium percarbonate and/or sodium tripolyphosphate.

This sodium percarbonate particle generally contains 8 to 15 weight % active oxygen.

The sodium percarbonate particles of the invention depending on the apparatus used for their production have a spherical or nearly spherical shape and are present in a size from dust up to 2 mm.

It goes without saying there are also included as suitable percarbonate particles those which depending on the degree of purification of the starting components likewise contain these impurities.

As sodium percarbonate there can be used those produced by known processes, either directly from the process of production with still adhering mother liquor, or dry sodium percarbonate, in any case in a particle size from dust to 1.00 mm.

For the purpose of encasing the sodium percarbonate and the sodium tripolyphosphate are added in finely divided form as encasing substances, the sodium percarbonate preferably as a powder.

As sodium silicate there can be used, for example, sodium metasilicate ($Na_2SiO_3$), sodium disilicate ($Na_2Si_2O_5$) and sodium orthosilicate ($Na_4SiO_4$). A preferred silicate is sodium metasilicate or dissolved silicate, e.g., in the form of waterglass.

An amount of sodium silicate corresponding to 0.1-1% $SiO_2$ in the sodium percarbonate particle is normally sufficient. For particularly high stability requirements the sodium percarbonate particles can even contain up to 5 weight % $SiO_2$.

However, it also is possible to observe a stabilization effect with an amount of silicate corresponding to 0.05 weight % $SiO_2$. A favorable amount for the $SiO_2$ content of the particle is 0.5-1.0 weight %.

For production of the sodium percarbonate particle the sodium percarbonate is preferably wet with silicate solution and then the encasing substance applied.

It is also possible to first moisten the sodium percarbonate with water or to use a sodium percarbonate still having adhering water that has come directly from the process of production. However, in such case depending on this amount of water already present, a correspondingly more strongly concentrated sodium silicate solution is added, since the sodium percarbonate present need only be wetted, i.e., should only be wet that the applied encasing substance adheres thereon.

It is also possible to apply besides the encasing substance even the sodium silicate in solid form or in a mixture of encasing substance and sodium silicate.

But in the latter case, this mixture should be as homogeneous as possible.

The wetting with a sodium silicate solution is carried out according to the mixing apparatus used (revolving drum, granulating screw, granulating plate) and its degree of intensity of mixing by spraying on or free jets, e.g., in a revolving drum by spraying or in a granulating screw by allowing it to flow in directly based on the intensity of intermixing.

The coating is accomplished by known processes such as careful dusting by hand with a shovel, careful powdering on and simultaneously movement or dosaging via a trough with simultaneous movement.

The amount of water applied depends on the apparatus. In the apparatus used in the examples the amount of sprayed on water is, e.g., about 4% of the sodium percarbonate, see the examples.

If the apparatus allows, as already stated, an intensive wetting of the percarbonate granules, than a higher amount of water is used. If the apparatus permits a lesser wetting, then there must be used less than about 4% of water. This can be established readily by hand experiments.

The sequence "wetting and coating" can be carried out one or more times according to the degree of coating desired. Finally, a complete encasing with sodium silicate and sodium percarbonate and/or sodium tripolyphosphate is reached.

*) The desired strength is dependent upon the purpose of use. The thus produced sodium percarbonate particles finally can be completely or partially dehydrated, i.e., be freed of wetting water.

Wetting and encasing occur generally on granulating plates, in granulating extruders, in granulating drums and other known apparatus.

In the following examples the sodium percarbonate is present in a revolving drum and in a first process step sprayed with waterglass solution and in a second process step encased with sodium percarbonate dust or sodium tripolyphosphate.

The following abbreviations are employed:
NaPc = sodium percarbonate
NaPb = sodium perborate
Oa = active oxygen
SG = bulk density
kg/l = kilograms/liter The amount X of inert material obtained by the following calculation example assuming the applied water is removed 100%

$$100g\ NaPC\ (14\%\ Oa) + xg = yg\ (10\%\ Oa) \quad (1)$$

$$10\%\ (y) = 14g\ Oa$$

$$100\%\ (y) = 140\ g \quad (2)$$

(2) in (1) inserted:

$$100g\ NaPc + xg\ NaTPP = 140g\ y\ (NaTPP = \text{sodium tripolyphosphate})\ X = 40\ \text{grams inert materials}$$

i.e., 100 grams NaPc (14% Oa) are able to be encased with 40 grams of inert material, that is, about 28.5% based on the NaPc particle obtained with 10% active oxygen. Of this 28.5% there is accordingly an amount of sodium silicate corresponding to 0.05–5% $SiO_2$ and the remainder is sodium tripolyphosphate.

The degree of stability in moist atmosphere is demonstrated by the following stability test.

A series of experiments with the test products of Examples 1 and 2 of the sodium percarbonate starting product and sodium perborate tetrahydrate (as standard) were weighed in samples of about 2 grams in open weighing glasses (diameter = 35 mm, height = 30 mm).

All samples of this series of tests were placed in a desiccator (diameter = 150 mm, height = 150 mm) in which 670 ml of 10.56% sulfuric acid is present and stored in an incubator at +30° C for 4 days. Two further desiccators, one for each series of experiments with the same filling of samples were stored 7 and 10 days at +30° in the incubator.

A relative air humidity of 96% was maintained by the sulfuric acid present in the desiccators. After the end of the tests, the entire contents of each test glass were analyzed.

This stability method shows that compared to the sodium percarbonate not encased with sodium percarbonate dust and/or sodium tripolyphosphate and sodium silicate there was reached a higher active oxygen stabilization.

When the encasing layer consists essentially of sodium silicate and either sodium percarbonate or sodium triphosphate generally the sodium silicate is 0.1 to 10% of the binary mixture.

When the encasing layer consists essentially of sodium silicate, sodium percarbonate and sodium tripolyphosphate generally the sodium silicate is 0.1 to 10%, the sodium percarbonate is 5 to 80% and the sodium tripolyphosphate is 15 to 90%, the total of all three components of the encasing layer being 100%.

Unless otherwise indicated all parts and percentages are by weight.

The composition can consist essentially of or consist of the materials set forth.

The process can comprise, consist essentially of or consist of the steps set forth.

The invention will be further explained in the following examples.

DESCRIPTION OF THE PREFERRED EMBODIMENTS

EXAMPLE 1

In a revolving drum (diameter = 250 mm, height = 250 mm), which at the same intervals contained four driving ribs 15 mm in width, there were present at a pitch of 15° and a rotating speed of 30 rpm, 1,080 grams of sodium percarbonate and in the following process steps they were sprayed with 130 ml of waterglass solution (containing 40.8 grams of waterglass 36° Baume) and encased with 120 grams of sodium tripolyphosphate:

| Process Step No. | Addition of Na-tripolyphosphate g | Waterglass Addition ml | Time min/sec |
|---|---|---|---|
| 1 | — | 43 | 1' |
| 2 | 22 | — | 4' |
| 3 | — | 20 | 45" |
| 4 | 19 | — | 3' 45" |
| 5 | — | 20 | 45" |
| 6 | 28 | — | 5' |
| 7 | — | 20 | 57" |
| 8 | 33 | — | 5' |
| 9 | — | 27 | 36" |
| 10 | 18 | — | 4' |

After the last process step, the test product was dried in the drying cabinet at 55–60° C for about 60 minutes.

Analytical data is set forth in the TABLE OF ANALYTICAL RESULTS.

EXAMPLE 2

As described in Example 1, there were present in a revolving drum at a pitch of 15° and a rotating speed of 30 rpm, 1,080 grams of sodium percarbonate and in the following process steps they were sprayed with 120 ml of waterglass solution (containing 40.8 grams of waterglass 36° Baume) and encased with 182 grams of sodium percarbonate dust:

| Process Step No. | Addition of NaPc-Dust g | Waterglass Addition ml | Time min/sec |
|---|---|---|---|
| 1 | — | 43 | 1' |
| 2 | 30 | — | 5' |
| 3 | — | 20 | 50" |
| 4 | 42 | — | 6' |
| 5 | — | 20 | 1' |
| 6 | 29 | — | 4' 30" |
| 7 | — | 20 | 1' |
| 8 | 19 | — | 3' |
| 9 | 23 | — | |
| 10 | — | 17 | |
| 11 | 39 | — | |

After the last process step, the test product was dried in a drying cabinet at 55–60° C for about 60 minutes.

Analytical data is set forth in the TABLE OF ANALYTICAL RESULTS.

TABLE OF ANALYTICAL RESULTS

| | Standard NaPb-Tetrahydrate | Starting Material NaPc-Starting Material | NaPc Dust | Na-tripoly-phosphate | Test Product Example 1 | Test Product Example 2 |
|---|---|---|---|---|---|---|
| Active Oxygen (Oa) % | 10.20 | 13.20 | 12.92 | — | 11.79 | 13.15 |
| $Na_2O$ % | 20.38 | 38.51 | — | — | 35.77 | 38.13 |
| $B_2O_3$ % | 22.77 | — | — | — | — | — |
| $CO_2$ % | — | 27.33 | — | — | 23.95 | 27.03 |
| $SiO_2$ % | 0.002 | 0.01 | — | — | 0.88 | 0.74 |
| $P_2O_5$ % | 0.003 | 0.58 | — | 58.9 | 8.5 | — |
| Bulk Density kg/l | 0.760 | 0.930 | 0.890 | 0.680 | 0.850 | 0.840 |
| Sieve Analysis on: | | | | | | |
| 0.8 mm % | 0 | 0 | 0 | 0 | 0 | 0 |
| 0.5 mm % | 35 | 38 | 0 | 1 | 47 | 53 |
| 0.4 mm % | 17 | 18 | 0 | 4 | 21 | 20 |
| 0.2 mm % | 43 | 32 | 1 | 30 | 27 | 23 |
| 0.1 mm % | 4 | 11 | 62 | 38 | 5 | 4 |
| Residue % | 1 | 1 | 37 | 27 | 0 | 0 |
| Oa-decomposition after 4 days.% | 0 | 43 | — | — | 10 | 6 |
| at + +° C and 96% rel. after 7 days.% | 0 | 94 | — | — | 31 | 28 |
| air humidity after 10 days.% | 0 | 100 | — | — | 53 | 44 |

What is claimed is:

1. Sodium percarbonate particles consisting essentially of a sodium percarbonate nucleus and an encasing layer consisting essentially of sodium silicate and either (1) sodium percarbonate, (2) sodium tripolyphosphate or (3) sodium percarbonate and sodium tripolyphosphate.

2. Sodium percarbonate particles according to claim 1 wherein the encasing layer consists essentially of sodium silicate and sodium percarbonate.

3. Sodium percarbonate particles according to claim 1 wherein the encasing layer consists essentially of sodium silicate and sodium tripolyphosphate.

4. Sodium percarbonate particles according to claim 1 wherein the encasing layer consists essentially of sodium silicate, sodium percarbonate and sodium tripolyphosphate.

5. Sodium percarbonate particles according to claim 1 having a total active oxygen content of 8 to 15%.

6. Sodium percarbonate particles according to claim 5 wherein the amount of sodium silicate is such as to provide an $SiO_2$ content of 0.05 to 5% in the particles.

7. Sodium percarbonate particles according to claim 2 wherein the encasing layer is formed from waterglass and sodium percarbonate dust.

8. Sodium percarbonate particles according to claim 3 wherein the encasing layer is formed from waterglass and sodium tripolyphosphate.

9. A process for preparing the product of claim 1 comprising wetting with the sodium percarbonate nucleus with aqueous sodium silicate and thereafter coating the wet particles with (1) sodium percarbonate dust, (2) sodium tripolyphosphate or (3) a mixture of sodium percarbonate dust and sodium tripolyphosphate.

10. The process of claim 9 consisting essentially of wetting the sodium percarbonate nucleus with waterglass and thereafter coating the wet particles with sodium percarbonate dust.

11. The process of claim 9 consisting essentially of wetting the sodium percarbonate nucleus with waterglass and thereafter coating the wet particles with sodium tripolyphosphate.

12. The process of claim 9 consisting essentially of wetting the sodium percarbonate nucleus with waterglass and thereafter coating the wet particles with both sodium percarbonate dust and sodium tripolyphosphate.

13. The process of claim 9 including the step of at least partially removing the water employed in the aqueous sodium silicate solution.

14. Sodium percarbonate particles according to claims 1 wherein the sodium silicate is selected from the group consisting of sodium metasilicate, sodium disilicate, sodium otho silicate and water glass.

15. Sodium percarbonate particles according to claim 1 wherein the encasing layer consists essentially of either:
    (a) 0.1 to 10% sodium silicate and 99.9 90% of sodium percarbonate,
    (b) 10.1 to 10% sodium silicate and 99.9 to 90% of tripolyphosphate, or
    (c) 0.1 to 10% sodium silicate, 5 to 80% sodium percarbonate and 15 to 90% sodium tripolyphosphate, the total of all three components of the encasing layer being 100%.

16. Sodium percarbonates particles according to claim 15 wherein the amount of sodium silicate is such as to provide 0.05 to 5% $SiO_2$ content in the particles.

17. Sodium percarbonate particles according to claim 15 consisting of a sodium percarbonate nucleus and an encasing layer consisting of (a), (b) or (c).

* * * * *